(12) United States Patent
Zink

(10) Patent No.: US 9,022,057 B2
(45) Date of Patent: May 5, 2015

(54) FLOW CONTROLLED SWITCHING VALVE

(71) Applicant: Stoneage, Inc., Durango, CO (US)

(72) Inventor: Gerald P. Zink, Durango, CO (US)

(73) Assignee: Stoneage, Inc., Durango, CO (US)

( * ) Notice: Subject to any disclaimer, the term of this patent is extended or adjusted under 35 U.S.C. 154(b) by 0 days.

(21) Appl. No.: 14/177,440

(22) Filed: Feb. 11, 2014

(65) Prior Publication Data

US 2014/0150894 A1 Jun. 5, 2014

Related U.S. Application Data

(62) Division of application No. 13/027,091, filed on Feb. 14, 2011, now Pat. No. 8,667,987.

(51) Int. Cl.
| | |
|---|---|
| *F16K 31/12* | (2006.01) |
| *B08B 3/02* | (2006.01) |
| *B08B 9/049* | (2006.01) |
| *B05B 1/14* | (2006.01) |
| *B05B 13/06* | (2006.01) |
| *F16K 31/163* | (2006.01) |
| *F16K 31/58* | (2006.01) |
| *F16K 11/04* | (2006.01) |

(52) U.S. Cl.
CPC .............. *B08B 3/02* (2013.01); *B08B 9/0495* (2013.01); *B05B 1/14* (2013.01); *B05B 13/0627* (2013.01); *F16K 31/1635* (2013.01); *F16K 31/58* (2013.01); *F16K 11/04* (2013.01)

(58) Field of Classification Search
CPC .......... B08B 9/0495; B08B 3/02; B05B 1/14; B05B 13/0627; F16K 31/58; F16K 31/1635
USPC ............................. 137/240, 624.27, 872, 874
See application file for complete search history.

(56) References Cited

U.S. PATENT DOCUMENTS

| | | | |
|---|---|---|---|
| 3,707,168 A | 12/1972 | Boelkins | |
| 3,774,634 A | 11/1973 | Bonney | |
| 4,744,285 A | 5/1988 | Presley | |
| 4,921,002 A | 5/1990 | Christon et al. | |
| 5,551,458 A * | 9/1996 | Faxon | ........................ 134/22.12 |
| 6,279,594 B1 | 8/2001 | Beitzel et al. | |
| 7,513,261 B2 * | 4/2009 | Ura | ............................ 134/22.11 |
| 8,940,108 B2 * | 1/2015 | Stutchbury | ................ 134/168 C |
| 2007/0199601 A1 | 8/2007 | Imhof | |

* cited by examiner

*Primary Examiner* — Kevin Lee
(74) *Attorney, Agent, or Firm* — Greenberg Traurig, LLP

(57) ABSTRACT

A flow path switching valve is disclosed that can be operated remotely simply by turning flow on and off. A mid portion of the body has at least one passage therein leading from a central axial bore to one or more external ports each having a tractor nozzle. The valve outlet connects the axial bore to a cleaning nozzle. A poppet member is received in the central axial bore. In a first position, the poppet member directs fluid flow through the outlet to the cleaning nozzle connected to the outlet. The poppet member, when in a second position, closes the central axial bore through the outlet end of the valve body and permits fluid flow through the tractor nozzles. Selection of the different flow paths is made by simply reducing flow through the valve below a predetermined fluid flow threshold and then increasing the flow rate above the threshold.

20 Claims, 6 Drawing Sheets

FLOW CONTROLLED SWITCHING VALVE

CROSS REFERENCE TO RELATED APPLICATIONS

This application is a divisional of U.S. patent application Ser. No. 13/027,091, entitled Flow Controlled Switching Valve, filed Feb. 14, 2011, now U.S. Pat. No. 8,667,987, the content of which is hereby incorporated by reference in its entirety.

BACKGROUND OF THE DISCLOSURE

Traction nozzles are used in sewer pipe lines and other piping systems to assist in pulling high pressure hose into the pipe to reach obstructions requiring removal. These traction nozzles have jet tips oriented at an angle rearward in order to generate thrust in the nozzle within the pipe to assist in pulling the hose through and along long stretches of pipe and around pipe bends. These nozzles have forward directed jet tips to ablate the obstructions encountered. However, the forward directed jet tips produce a counter force against forward travel of the nozzle through the pipe. This counterforce hinders effective deployment of the high pressure hose and reduces the net pulling force produced by the traction nozzle on the high pressure hose. Thus there is a need for a switching mechanism that does not generate a counterforce during traction operation, yet facilitates operation of an effective fluid jet nozzle during actual cleaning operations.

SUMMARY OF THE DISCLOSURE

The present disclosure directly addresses this problem. A switching valve in accordance with a first embodiment in the present disclosure provides a simple valve device that switches, or redirects fluid flow between a first flow path such as to rearwardly directed nozzle jets and a second flow path, such as to forwardly directed cleaning jets, remotely. This is accomplished simply by decreasing fluid flow through the valve below a predetermined threshold level and then increasing fluid flow above the threshold level. The valve can provide full pressure and fluid flow to each of the flow paths separately.

A valve in accordance with the present disclosure essentially has at least two operative positions, analogous to operation of a retractable ball point pen. One exemplary use of the valve is in sewer pipe cleaning with water jet nozzles. In such a configuration the valve in accordance with the present disclosure is installed between a cleaning nozzle assembly and a high pressure fluid hose sized to be inserted into a sewer or other piping system.

The valve preferably includes a plurality of tractor nozzles arranged to provide maximum pulling force to advance the hose, to which the valve is connected, through the sewer piping system to a distant area needing cleaning. When the cleaning nozzle, attached to the front end of the valve, arrives at the area needing cleaning, a temporary flow interruption by the operator causes the valve to automatically switch from a first position directing fluid flow to the rearwardly directed tractor nozzles to an intermediate position. The valve automatically switches from the intermediate position to a second position directing fluid flow to the forwardly directed cleaning nozzle or nozzles when flow is restored. Another flow interruption causes the valve to reposition again to an intermediate position. Restoration of fluid flow above the threshold again switches the valve back to the first position directing fluid flow to the rearwardly directed tractor nozzles. A further flow interruption causes the valve to return to the intermediate position. Restoration of fluid flow above the threshold causes the valve to again switch to the second position as above described. Thus each time the flow is interrupted and then restored causes the valve to switch positions and hence flow paths.

One exemplary embodiment of the flow actuated flow path switching valve includes a hollow valve body having an inlet end, an outlet end, a mid portion, and a central axial bore through the inlet end, the mid portion, and the outlet end. The mid portion has at least one passage therein leading from the central axial bore through the valve body to at least one external port having a tractor nozzle mounted therein. An elongated poppet member is received, or carried, in the central axial bore of the valve body.

The poppet member has an open tubular rear end portion, a spool portion and a closed valve disc end portion. The poppet member can move axially back and forth in the central axial bore. The poppet member has an axial bore extending through the rear portion and at least part of the spool portion of the poppet member. The spool portion has one or more radial arms extending outward to abut against the mid portion of the valve body. The valve disc portion selectively closes the central axial bore through the outlet end of the valve body when contact is made with a seat formed in the outlet end of the valve body.

A biasing member such as a spring is preferably positioned between the valve body and the poppet member such that it resiliently biases the poppet member toward the inlet end of the valve body. The spring is held and compressed between a flange around the rear end portion of the poppet member and a shoulder in the central axial bore through the valve body. Fluid pressure and flow exerted on the rear end portion of the poppet member compresses the spring to move the poppet member forward, away from the inlet end of the valve body. Reduction of fluid pressure/flow below a threshold permits the spring to push the poppet member rearward.

The valve further includes a guide in the valve body that engages a corresponding feature on the rear end portion of the poppet member to change orientation of the poppet member each time fluid flow through the valve drops below a threshold value. Specifically, at a first position of the poppet member, this guide and corresponding feature cooperate to align the radial arm on the spool portion with the at least one passage in the mid portion of the valve body and open the central axial bore through the outlet end of the valve body when fluid flow is introduced into the inlet end of the valve body at the first position.

This guide also causes the poppet to rotate and misalign the radial passage in the spool portion away from the at least one passage in the mid portion of the valve body when fluid flow is reduced below the predetermined flow rate threshold, to an intermediate position. The guide is configured to align the arm of the spool portion at a second position different from the first position, also closing the central axial bore through the outlet end, when fluid flow is next introduced in the inlet end of the valve body above the flow rate threshold. In this second position, fluid flowing around the arm of the spool portion enters and passes through the at least one passage in the mid portion of the valve body.

One exemplary embodiment of the valve has four radial arms on the spool portion of the poppet and four passages through the mid portion of the valve body leading to four rearwardly directed tractor nozzles. These tractor nozzles exit the valve body at a rearward angle. The reaction force of the fluid jet exiting these nozzles pulls the valve and the hose connected thereto into the piping system. Fluid flows through these nozzles when the valve is in the second position. When an obstruction is reached in the piping system, the operator simply turns off the flow, thus reducing flow below the threshold and the valve poppet moves rearward to an intermediate, or mid, position.

When flow is again restored by the operator turning flow back on, the poppet moves forward, rotating via the guide, to the first position. In the first position, the radial arms are aligned with the passages through the mid portion of the valve body, thus closing the passages. At the same time, the poppet is prevented from closing the outlet portion, thus permitting fluid flow past the poppet and out the outlet end of the valve to the cleaning nozzle attached to the front end of the switching valve.

In a preferred embodiment, the poppet spool portion has a central bore and a passage leading from the central bore through each of the radial arms. In each passage through the radial arm is a stopper ball which, due to fluid pressure, completely plugs the passage through the mid portion of the valve body such that no fluid can flow to the tractor nozzles. These stopper balls ensure complete stoppage of fluid flow through the tractor nozzles when flow is being directed through the valve outlet to the cleaning nozzle.

Further features, advantages and characteristics of the embodiments of this disclosure will be apparent from reading the following detailed description when taken in conjunction with the drawing figures.

DETAILED DESCRIPTION

Figure 1:
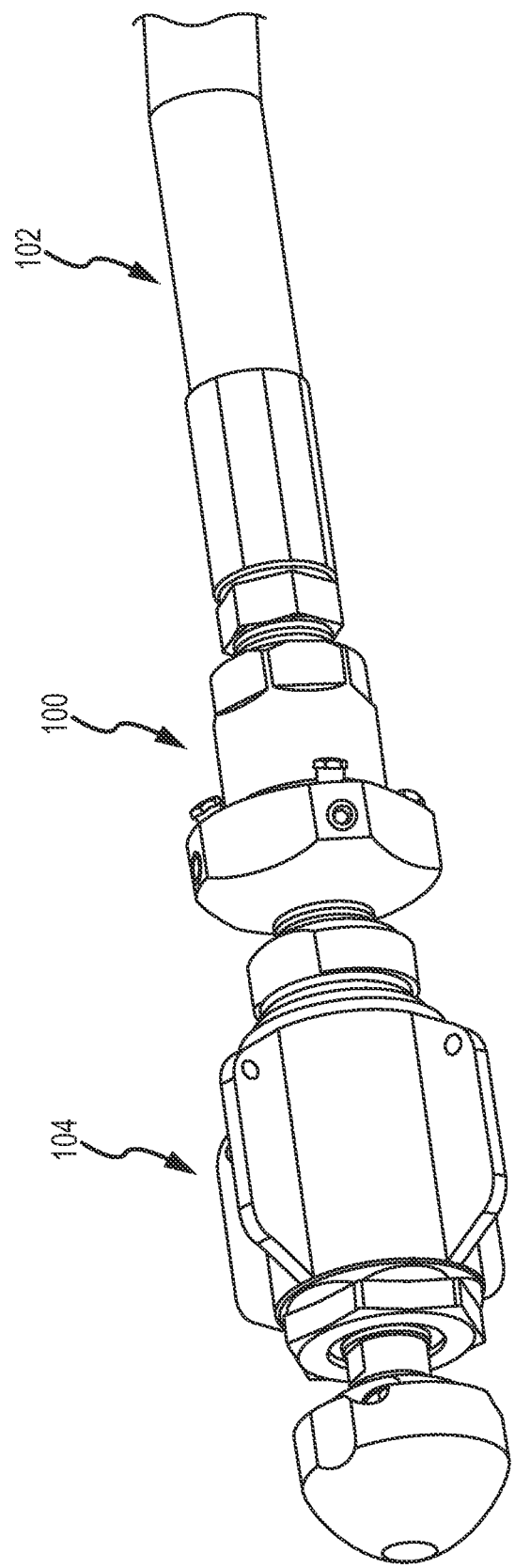
FIG. 1 is an external perspective view of one exemplary embodiment of a switching valve in accordance with this disclosure connected between a fluid hose and a cleaning nozzle.
Figure 2:
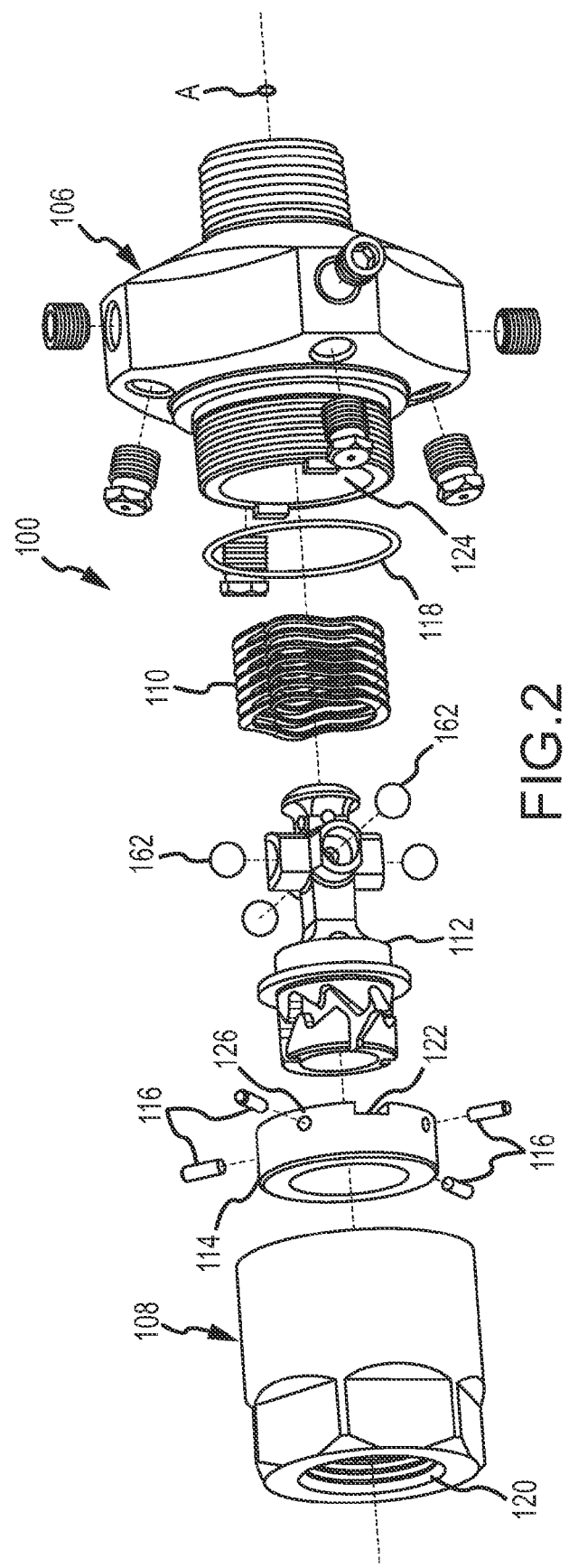
FIG. 2 is a separate exploded perspective view of the switching valve shown in FIG. 1.

An exemplary embodiment of a switching valve 100 is shown in FIG. 1 connected to a high pressure fluid hose 102 and to a cleaning nozzle 104. The switching valve 100 essentially has a generally cylindrical compact outer shape so that it can be inserted into pipes and other tubular passages. A separate exploded perspective view of the valve 100 is shown in FIG. 2. As shown in FIG. 2, the valve 100 includes a hollow main valve body 106 and an inlet end guide cap 108. Inserted into the main valve body 106 is a spring 110 and a poppet member 112. Inserted into the inlet end guide cap 108 is a guide collar 114 which carries four equally spaced guide pins 116. The inlet end guide cap 108 is sealed with an O-ring 118 and threaded onto the valve body 106, thus capturing together the poppet member 112, spring 110, guide collar 114 with guide pins 116.

The inlet end cap 108, at its rear, may have internal threads 120 as shown or alternatively may have external threads to mate with corresponding high pressure hose thread connections. The forward portion of the inlet end cap 108 has a recess to receive the guide collar 114 and has internal threads so as to be screwed onto the rear portion of the main valve body 106.

The guide collar 114 is a tubular sleeve that has a pair of alignment notches 122 which engage corresponding projections 124 on the rear portion of the main valve body 106. The engaged projections 124 prevent rotation of the collar 114 when assembled in the inlet end cap 108. The guide collar 114 also has four radial bores 126 therethrough each receiving a guide pin 116 press fit therein. When the guide collar 114 is assembled into the end cap 108, a portion of each of the guide pins 116 projects radially inward toward the axial centerline of the end cap 108.

Figure 3:
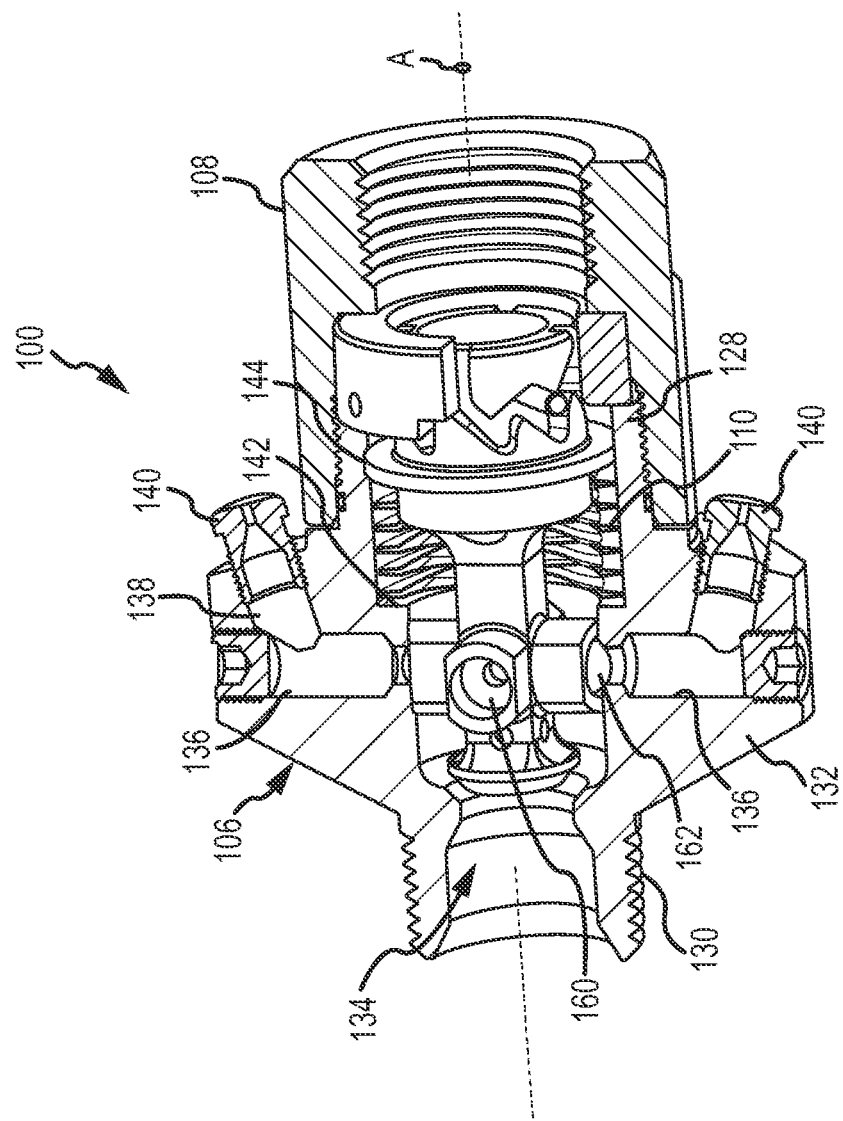
FIG. 3 is a longitudinal cross sectional view of the assembled switching valve body shown in FIG. 1 in accordance with the present disclosure, with the poppet and guide shown in perspective, in the first position.
Figure 4:
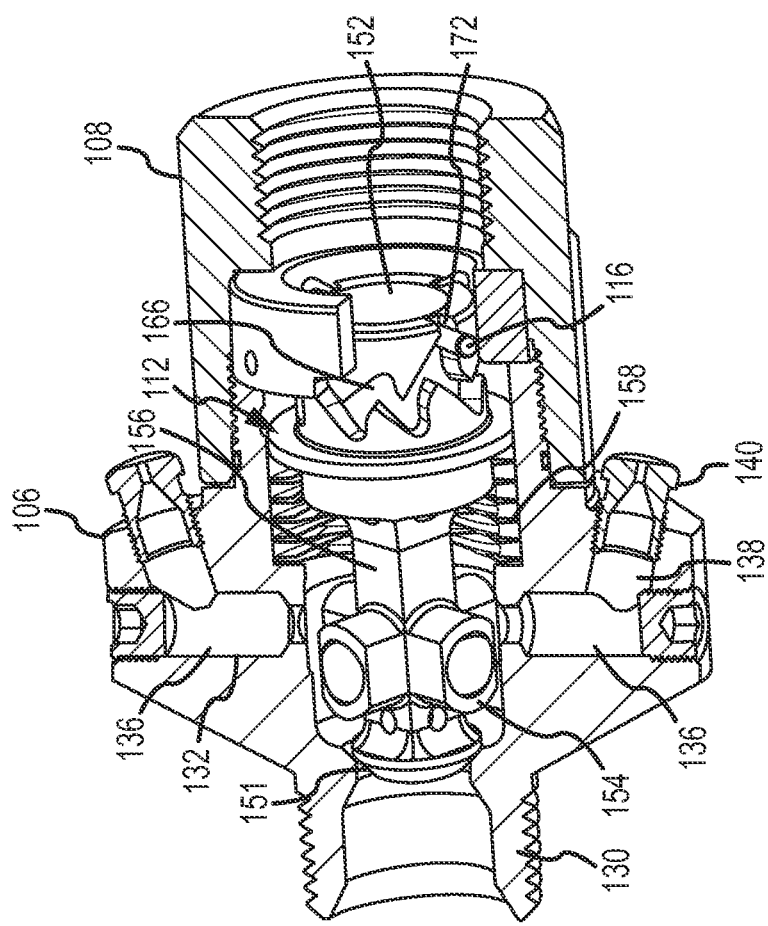
FIG. 4 is a view as in FIG. 3 with the poppet in the second position.
Figure 5:
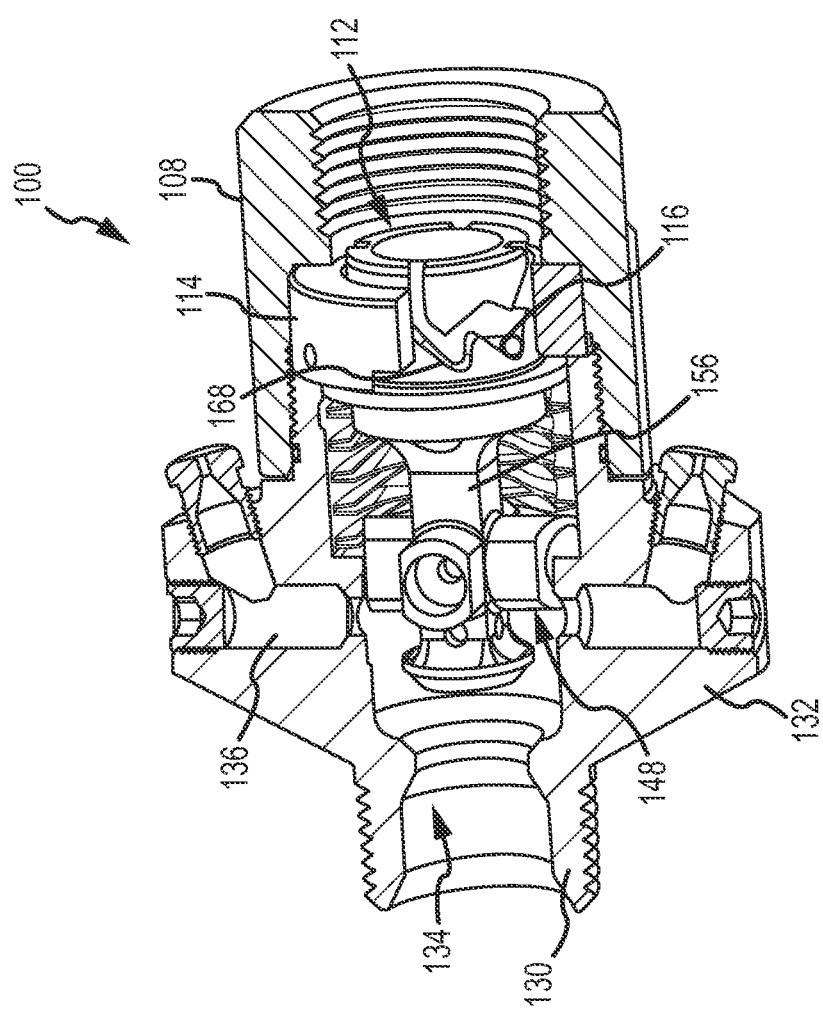
FIG. 5 is a view as in FIG. 3 with the poppet in the mid, or low flow, position.

The main valve body 106 is shown in cross section in FIGS. 3, 4 and 5. The valve body 106 is generally symmetrical about a central axis A. The valve body 106 has a an inlet end 128, an outlet end 130, a mid portion 132, and a central axial bore 134 through the inlet end 128, the mid portion 132, and the outlet end 130. The mid portion 132 has an enlarged flange external shape and has at least one passage 136 therein leading from the central axial bore 134 through the valve body 106 to at least one external port 138. In the exemplary embodiment of the valve 100 shown, there are four passages 136, equally spaced radially apart by 90°, leading to four external ports 138. Threaded into each external port 138 is a nozzle jet tip 140. Each of the external ports 138 is rearwardly directed at an angle such that forward thrust is exerted on the valve 100 when high pressure fluid is ejected through the nozzle jet tips 140 to push the valve, attached hose 102, and cleaning nozzle 104 through piping to the location needing to be cleaned. Note that, in the exemplary embodiment shown, there are four passages 136. Other valve body configurations are also envisioned, such has a valve body having any number of radial passages in the mid portion 132 of the valve body 106 leading to a corresponding number of ports 138, each having an appropriate nozzle jet tip 140 attached thereto.

The bias member 110 is a spring, such as a coil spring, and more preferably a flat wire wave compression spring that is captured between an internal shoulder 142 in the mid portion 132 of the valve body 106 and an annular flange 144 on the poppet member 112. This spring bias member 110 urges the poppet member 112 rearward toward the inlet end of the valve 100 in the absence of fluid pressure and flow. When fluid flow is introduced into the valve 100, the spring bias member 110 is compressed, urging the poppet member 112 forward as is described in more detail below.

Figure 6:
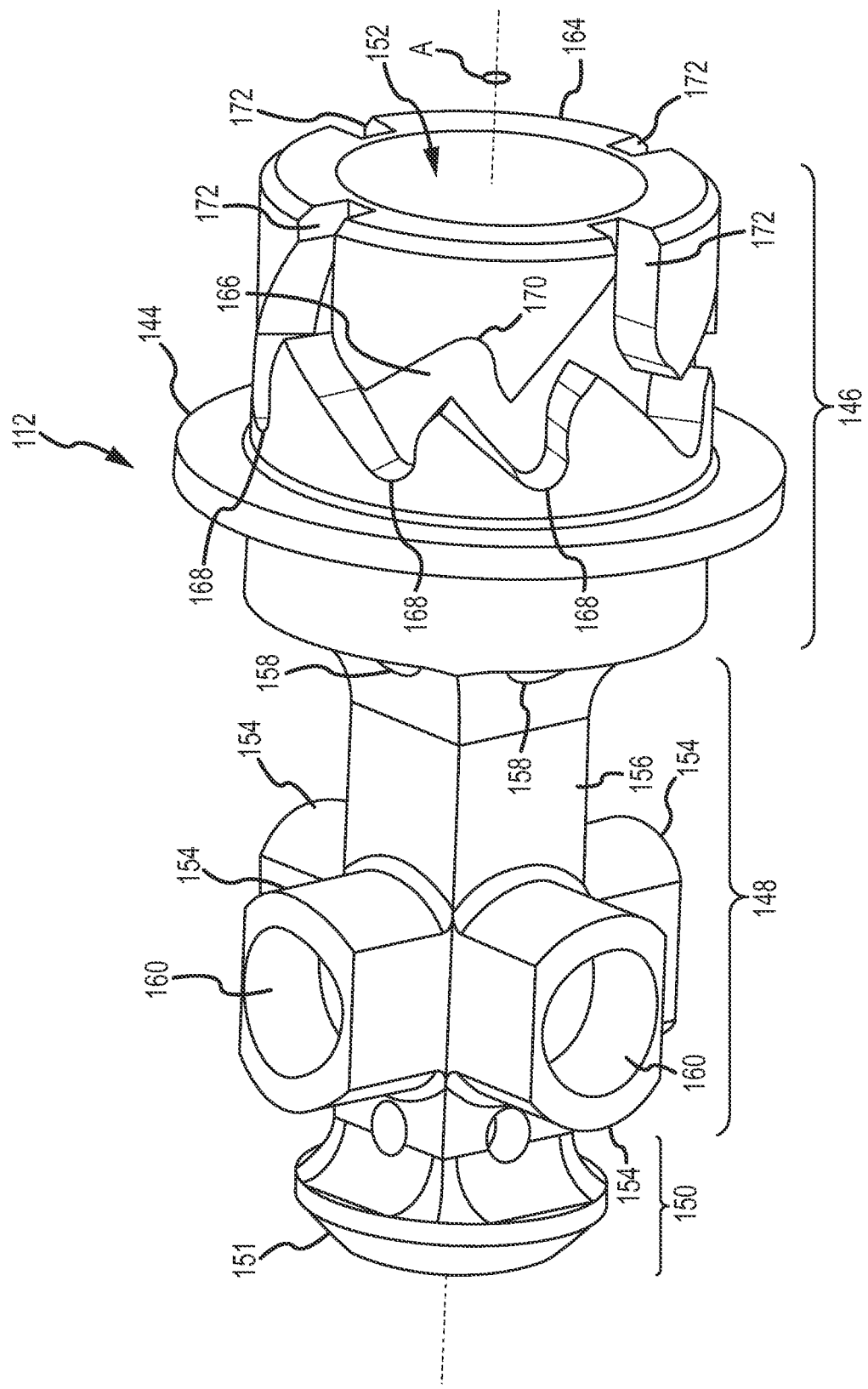
FIG. 6 is separate perspective view of the poppet shown in FIGS. 2-5, shown without the stopper balls in place, in accordance with the present disclosure.

The poppet member 112 is separately shown in FIG. 6. The poppet member 112 is a generally elongated body generally symmetrical about a central axis A. The poppet member 112 has an open tubular rear end portion 146, a spool portion 148 and a closed end valve disc portion 150. The disc 151 of the valve disc portion 150 selectively closes the central axial bore 134 through the outlet end 130 of the valve body 106. The poppet member 112 has an axial bore 152 extending through the rear portion 146 and part of the spool portion 148 of the poppet member 112. The spool portion 148 has one or more radial arms 154, preferably an even number, and in the illustrated exemplary embodiment, four radial arms 154, extending outward radially from a central stem 156 of the spool portion 148 to the inner wall of the mid portion 132 of the valve body 106. The spool portion 148 of the poppet member 112 also has several ports 158 leading forward from the bore 152 out of the rear portion 146. These ports 158 permit fluid flow through the bore 152 and around the arms 154 to and past the disc 151 of the closed end valve disc portion 150 of the poppet 112 and through the outlet 130 of the valve body 106 when the poppet 112 is in the second position.

Each of the radial arms 154 has a central passage 160 therethrough. Furthermore, each of the passages has a ball 162 disposed therein (shown in FIGS. 2 & 3). When the valve 100 is in the first position, shown in FIG. 3, the radial arms 154 are aligned with the passages 136. As fluid flows through the passages 160 into the passages 136, the balls 162 seat to close and block any further flow through passages 136. Fluid also flows through the axial bore 152 and through the ports 158, around the radial arms 154, and then to the outlet end 130 of the valve body 106 around the closed end valve disc portion 150. This configuration is shown in FIG. 3.

Turning back now to FIG. 6, and the separate view of the exemplary poppet 112, the open rear end portion 146 of the poppet 112 will be described. The end portion 146 has a tubular side wall 164 that has a zig-zag pattern annular cam groove 166 formed in the tubular wall 164. This cam groove 166 is sized complementary to the diameter and depth of the pins 116 and has forward notches or vertices 168 each rotationally spaced about 45° apart along the groove 166. The cam groove 166 also has rear notches 170 spaced alternatingly with four axial grooves 172 spaced 90' apart. These axial grooves 172 merge with the cam groove 166 at an angular rotation position between the rear notches 170 in the groove 166.

Each of the four guide pins 116 ride in the cam groove 166 when the valve 100 is fully assembled. The sides of the cam groove 166 are angled toward the sequential forward and rear notches or vertices 168 and 170 of the groove 166 such that when the poppet moves forward and back as flow is applied or reduced, the poppet 112 has to rotate 22.5° clockwise each time as it moves forward or back with each change in flow above and below the predetermined threshold rate.

When fluid flow is off, or at least reduced below the predetermined threshold, established by the spring rate of the spring 110, the poppet 112 moves rearward to one of the intermediate positions as is shown in FIG. 5. In this intermediate, or mid position, the radial arms 154 of the spool portion 148 are offset from alignment with the passages 136 rendering the passages 136 open to the bore 134 through the main valve body 106. Also, the disc portion 150 is spaced from the seat of the outlet end 130 of the valve body 106.

If the position of the poppet 112 before flow decrease had been as shown in FIG. 3, (flow through the outlet to the cleaning nozzle 104), then, when fluid flow is again turned on, the poppet 112 again is moved forward by the fluid flow against the inlet end portion 146, but this time moves the poppet 112 to the position shown in FIG. 4. This is the second position, in which the arms 154 are not aligned with the passages 136 through the mid portion of the valve body 106, and the disc 151 of the closed end valve disc portion 150 closes the outlet 130. Fluid flow thus is free to pass through the axial bore 152 in the rear end portion of poppet 112, through the passages 158 out of the stem 156 of spool portion 148, around the arms 154, and through the passages 136 to the external ports 138 and tractor nozzle jet tips 140.

When flow is subsequently reduced below the predetermined threshold, such as by the operator turning off flow, the poppet 112 rotates rearward to a position similar to that shown in FIG. 5, except rotated one notch 168 further by 45° than that shown. When flow is again restored, the poppet 112 continues to rotate, forward this time, to a position identical to that shown in FIG. 3.

It is to be understood that various changes can be made to the switching valve 100 in accordance with the present disclosure. For example, the valve body may be configured with 2, 3, 4, 5, or 6 radial passages 136, and the corresponding poppet would thus have an equal number of properly spaced radial arms 154. Furthermore, if sufficiently close tolerances are maintained, the need for balls 162 and passages 160 through the radial arms 154 may be eliminated. In such a configuration, the radial arms 154 would be solid and configured to substantially close off the passages 136 to the external traction ports 138.

Alternatively different sets of ports could be provided in the valve body 106 to provide additional flow paths as may be needed for a particular application. For example, rather than having only two separate flow paths, a configuration that has three flow paths could be designed without departing from the scope of the present disclosure. In such a configuration the zig-zag guide groove would have a different number of notches 168 and 170 as would be required for such a configuration. The passages 136 could alternatively lead to a separate nozzle assembly fastened to the valve rather than having integral tractor jet tips 140 mounted directly to the valve body 106. Furthermore, jet tool nozzle configuration and/or patterns can be selected to control speed or direction.

Fluid flow may alternatively be directed to other end components rather than nozzles. For example, in other applications of the valve 100 disclosed herein, the fluid flow could be directed not to nozzles, but to actuators which could perform functions such as centralizing, clamping, bending, crushing, expanding, or plugging. Thus the implementation to which the switching valve 100 is applied may be substantially modified.

All such changes, alternatives and equivalents in accordance with the features and benefits described herein, are within the scope of the present disclosure. Such changes and alternatives may be introduced without departing from the spirit and broad scope of my invention as defined by the claims below and their equivalents.

What is claimed is:

1. In a piping cleaning apparatus having a high pressure fluid cleaning nozzle attached to a flexible hose for passage through a length of piping to a location requiring cleaning, a flow actuated switching valve connected between the hose and the cleaning nozzle, the switching valve comprising:
    a valve body having an inlet portion configured to be connected to the hose, a mid portion, an outlet portion configured to be connected to the cleaning nozzle, and a central axial bore therethrough, the mid portion having a plurality of rearwardly directed ports connected by passages to the central axial bore;
    an elongated poppet member slidably disposed in the central axial bore, the poppet member having a rear portion, a spool portion for selectively opening and closing the passages in the mid portion of the valve body and a closed end portion forming a valve disc for closing the outlet portion of the valve body;
    a bias member between the poppet member and the valve body biasing the poppet member rearward; and
    a guide member between the rear portion of the poppet member and the valve body for guiding the poppet member between first and second rotary positions when fluid flow through the valve drops below a predetermined flow rate threshold and then returns above the flow rate threshold.

2. The flow actuated switching valve according to claim 1 wherein the valve disc of the poppet member engages a complementary valve seat in the valve body closing the central axial passage when the poppet member is in the second position.

3. The flow actuated switching valve according to claim 2 wherein when fluid flow is again reduced below the predetermined threshold the valve disc of the poppet member disengages the valve seat and opens the central passage through the outlet portion of the valve body.

4. The flow actuated switching valve according to claim 3 wherein when fluid flow is again increased above the predetermined threshold the guide causes the poppet member to again return to the first position.

5. The flow actuated switching valve according to claim 1 wherein the poppet member has an axial bore extending through the rear portion and the spool portion of the poppet member and the spool portion has at least one or more radial arms extending to the mid portion of the valve body.

6. The flow actuated switching valve according to claim 5 wherein the at least one arm includes a radial passage from the axial bore to the end of the arm.

7. The flow actuated switching valve according to claim 6 further comprising a ball disposed in the radial passage for sealing the passage through the mid portion of the valve body when the poppet member is in the first position.

8. The flow actuated switching valve according to claim 1 wherein the poppet member has a plurality of bypass passages leading from the rear end portion around the axial bore in the spool portion.

9. The flow actuated switching valve according to claim 5 wherein the poppet member has a plurality of bypass passages through the rear end portion around the central axial bore in the spool portion.

10. The flow actuated switching valve according to claim 1 wherein the first position blocks fluid flow through the passage through the mid portion of the valve body and permits fluid flow through the valve body from the inlet end, around the spool portion of the poppet member, and out through the valve body outlet end.

11. The flow actuated switching valve according to claim 1 wherein the second position permits fluid flow through the passage in the mid portion of the valve body.

12. The flow actuated switching valve according to claim 1 wherein the guide member causes the poppet member to rotate when moving between the first and second positions.

13. The flow actuated switching valve according to claim 1 further comprising the poppet member being held at a third position when flow is reduce below the threshold.

14. The flow actuated switching valve according to claim 1 wherein the guide member includes a stationary pin projecting radially inward from an inside surface of the valve body into a complementary groove formed in the rear end portion of the poppet member.

15. The flow actuated switching valve according to claim 14 further comprising at least two spaced stationary pins projecting into complementary grooves formed in the rear end portion of the poppet.

16. The flow actuated switching valve according to claim 4 wherein the guide member includes two or more spaced stationary pins projecting radially inward from an inside surface of the valve body into a complementary groove formed in the rear end portion of the poppet member.

17. The flow actuated switching valve according to claim 16 wherein the guide member includes four equally spaced stationary pins and the complementary groove causes the poppet body to rotate about 45 degrees between each of the first and second positions.

18. In a piping cleaning apparatus having a high pressure fluid cleaning nozzle attached to a flexible hose for passage through a length of piping to a location requiring cleaning, a flow actuated switching valve connected between the hose and the cleaning nozzle, the switching valve comprising:
　　a hollow valve body having an inlet end, an outlet end, a mid portion, and a central axial bore through the inlet end, the mid portion, and the outlet end, the mid portion having at least one passage therein leading from the central axial bore through the valve body to at least one external port;
　　a poppet member received in the central axial bore, the poppet member having an open tubular rear end portion, a spool portion and a closed end valve disc portion, the valve disc portion selectively closing the central axial bore through the outlet end of the valve body, the poppet member having an axial bore extending through the rear portion and the spool portion of the poppet member, the spool portion having at least one or more radial arms extending to the mid portion of the valve body;
　　a biasing member between the valve body and the poppet member biasing the poppet member toward the inlet end of the valve body; and
　　a guide member between the rear end portion of the poppet member and the valve body for guiding the poppet member between first and second rotary positions when fluid flow through the valve drops below a predetermined flow rate threshold and then returns above the flow rate threshold.

19. The flow actuated valve according to claim 18 wherein the valve disc portion of the poppet member engages a complementary valve seat in the valve body closing the central axial passage when the poppet member is in the second position.

20. The flow actuated valve according to claim 19 wherein when fluid flow is again reduced below the predetermined threshold the valve disc portion of the poppet member disengages the valve seat and opens the central passage through the outlet end of the valve body.

* * * * *